US008582132B2

(12) United States Patent
Ruehle et al.

(10) Patent No.: US 8,582,132 B2
(45) Date of Patent: Nov. 12, 2013

(54) PRINT FORMAT TRANSFORM MECHANISM

(75) Inventors: Thomas Ruehle, Steamboat Springs, CO (US); David Tanigawa, Broomfield, CO (US); Craig Brossman, Durango, CO (US); John Condon, Berthoud, CO (US); Ronald Smith, Leawood, KS (US)

(73) Assignee: InfoPrint Solutions Company LLC, Boulder, CO (US)

( * ) Notice: Subject to any disclaimer, the term of this patent is extended or adjusted under 35 U.S.C. 154(b) by 124 days.

(21) Appl. No.: 13/300,116

(22) Filed: Nov. 18, 2011

(65) Prior Publication Data

US 2013/0128293 A1    May 23, 2013

(51) Int. Cl.
*G06F 15/00*    (2006.01)
(52) U.S. Cl.
USPC .......................................................... 358/1.13

(58) Field of Classification Search
USPC .......................................................... 358/1.13
See application file for complete search history.

(56) References Cited

U.S. PATENT DOCUMENTS

| 6,407,821 | B1 | 6/2002 | Hohensee et al. |
| 2006/0256357 | A1 | 11/2006 | Hochwender et al. |
| 2008/0037047 | A1 | 2/2008 | Condon et al. |
| 2009/0040558 | A1 | 2/2009 | Schwier |
| 2009/0279127 | A1 | 11/2009 | Kadiyala |
| 2010/0241952 | A1* | 9/2010 | Condon et al. ................ 715/251 |
| 2010/0296124 | A1 | 11/2010 | Joergens |
| 2010/0318901 | A1* | 12/2010 | Eiler et al. .................... 715/248 |

* cited by examiner

*Primary Examiner* — Saeid Ebrahimi Dehkordy
(74) *Attorney, Agent, or Firm* — Blakely, Sokoloff, Taylor & Zafman LLP

(57) ABSTRACT

A method disclosed. The method includes receiving a Portable Document Format (PDF) print job file, applying a first transform to generate an Advanced Function Presentation (AFP) image print job data stream and applying a second transform to generate an AFP text print job data stream.

14 Claims, 6 Drawing Sheets

Figure 3A

Insurance Specialists Company will pay the benefits provided in this Policy for loss due to Injury or Sickness.

We have issued this Policy to You in consideration of the payment of the premium and the statements made in Your application. Your application is part of Your Policy.

Insured      Geoffrey  R  Stephens

Policy Number   324-1443255-11              03-25-53       Date of Issue

Insurance Specialists Company will pay the benefits provided in this Policy for loss due to Injury or Sickness.

We have issued this Policy to You in consideration of the payment of the premium and the statements made in Your application. Your application is part of Your Policy.

Insured      Geoffrey  R  Stephens

Policy Number   324-1443255-11              03-25-53       Date of Issue

Insurance Specialists Company
100 Main Street
Anycity, Anystate 99999-9999

Figure 3C

PRINT FORMAT TRANSFORM MECHANISM

FIELD OF THE INVENTION

The invention relates to the field of printing systems, and in particular, to indexing print job image data.

BACKGROUND

Printers are common peripheral devices attached to computers. A printer allows a computer user to make a hard copy of documents that are created in a variety of applications and programs on a computer. To function properly, a channel of communication is established (e.g., via a network connection) between the printer and the computer to enable the printer to receive commands and information from the host computer. Once a connection is established between a workstation and the printer, printing software is typically implemented at a print server to manage a print job from job entry and management through the complete printing process. Print servers have the ability to receive print jobs in various presentation architectures.

Presentation architectures represent documents in a data format that is independent of the methods that are utilized to capture or create those documents. One example of an exemplary presentation system, which will be described herein, is the (Advanced Function Presentation) AFP™ system developed by International Business Machines Corporation. According to the AFP system, documents may include combinations of text, image, graphics, and/or bar code objects in device and resolution independent formats. Documents may also include and/or reference fonts, overlays, and other resource objects, which are required at presentation time to present the data properly.

Another presentation architecture is the Portable Document Format (PDF). Print processing PDF files typically involves passing the files through a pre-processor to transform the PDF files into an AFP image data stream, which has high print fidelity, prior to processing the AFP image data stream at a print server. However, the AFP image data stream does not include information necessary to access the data for applications other than printing. For example, print jobs including statement (e.g., banking or credit card) AFP image data streams cannot be indexed to retrieve postal information that could be used for postal optimization of mailings. Moreover, the AFP image data streams cannot be indexed to provide for archiving the AFP in a statement archive.

Accordingly, an indexable PDF to AFP transform is desired.

SUMMARY

In one embodiment, a method is disclosed. The method includes receiving a Portable Document Format (PDF) print job file, applying a first transform to generate an Advanced Function Presentation (AFP) image print job data stream and applying a second transform to generate an AFP text print job data stream.

In yet a further embodiment a printing system is disclosed. The printing system includes a first transform to convert a Portable Document Format (PDF) print job file to an Advanced Function Presentation (AFP) image print job data stream and a second transform to convert the PDF print job file to an AFP text print job data stream.

BRIEF DESCRIPTION OF THE DRAWINGS

A better understanding of the present invention can be obtained from the following detailed description in conjunction with the following drawings, in which:

FIG. 3 illustrate embodiments of converted AFP image and text data;

DETAILED DESCRIPTION

An indexable PDF to AFP transform mechanism is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
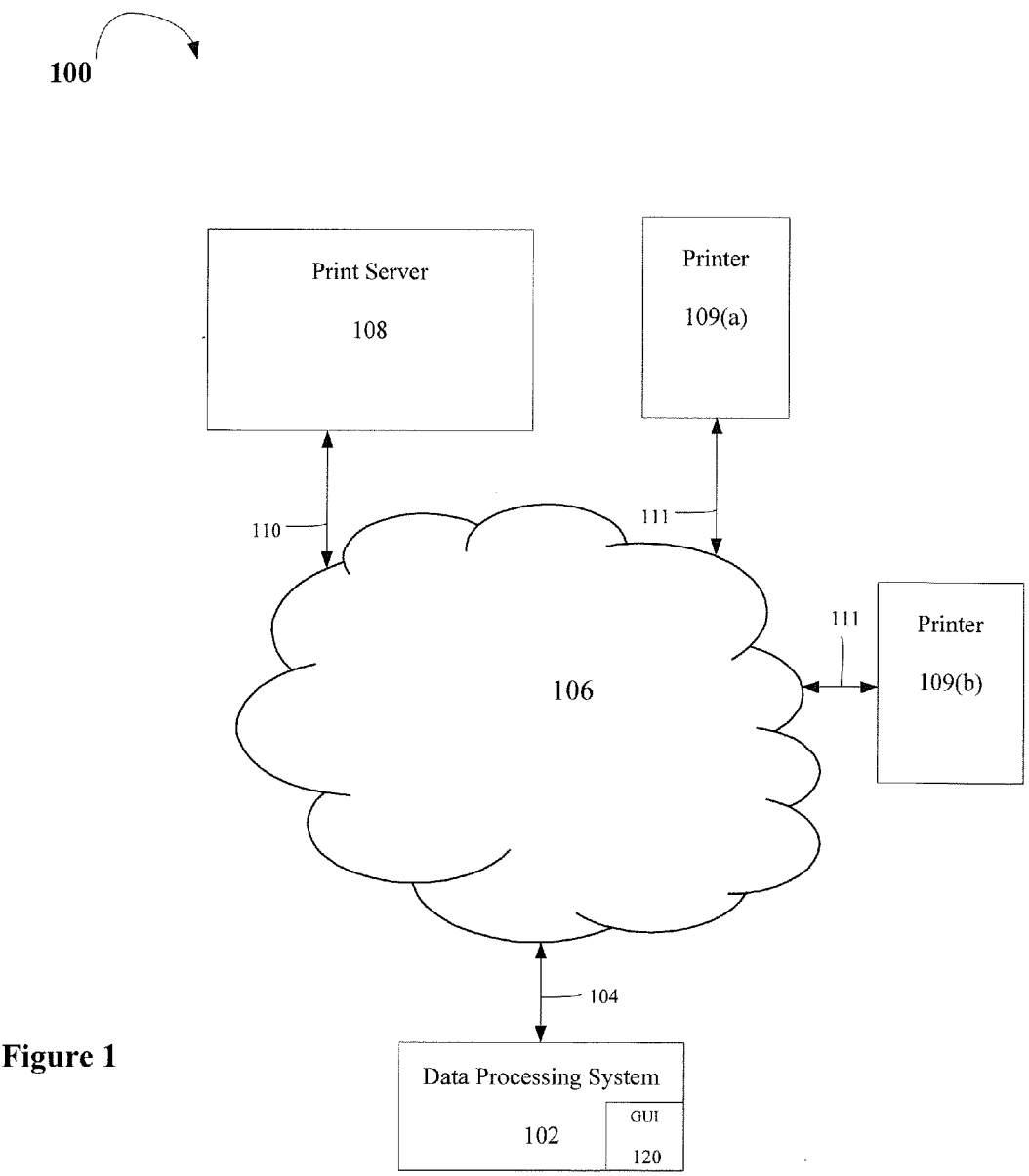
FIG. 1 illustrates one embodiment of a data processing system network.

FIG. 1 illustrates one embodiment of a data processing system network 100. Network 100 includes a data processing system 102, which may be either a desktop or a mobile data processing system, coupled via communications link 104 to network 106. In one embodiment, data processing system 102 is a conventional data processing system including a processor, local memory, nonvolatile storage, and input/output devices such as a keyboard, mouse, trackball, and the like, all in accordance with the known art.

In one embodiment, data processing system 102 includes and employs the Windows operating system, or other operating system, and/or network drivers permitting data processing system 102 to communicate with network 106 for the purposes of employing resources within network 106. Network 106 may be a local area network (LAN) or any other network over which print requests may be submitted to a remote printer or print server.

Communications link 104 may be in the form of a network adapter, docking station, or the like, and supports communications between data processing system 102 and network 106 employing a network communications protocol such as Ethernet, the AS/400 Network, or the like.

According to one embodiment, network 106 includes a print server 108 that serves print requests over network 106 received via communications link 110 between print server 108 and network 106. Print server 108 subsequently transmits the print requests via communications link 110 to one of printers 109 for printing, which are coupled to network 106 via communications links 111.

In one embodiment, the operating system on data processing system 102 allows a user to select print server 108 and submit requests for service to either printer 109 via print server 108 over network 106. In a further embodiment, print server 108 includes a print queue corresponding to each printer 109, where each queue includes print jobs requested by remote data processing systems 102.

According to one embodiment, print server 108 implements a printing software product that manages the printing of documents between data processing system 102 and printers 109. In other embodiments, the printing software product manages printing of documents from multiple data processing systems 102 to the one or more printers 109.

According to one embodiment, the printing software product may be implemented using either InfoPrint Manager (IPM) or InfoPrint ProcessDirector (IPPD), although other types of printing software may be used instead. In a further embodiment, the printing software product includes a graphical user interface (GUI) 120 that enables a system administrator (or operator) to interact with the printing software product.

In one embodiment, the printing software product receives the print jobs as a Mixed Object Document Content Architecture (MO:DCA) data stream. The printing software product processes pages of output that mix all of the elements normally found in presentation documents, e.g., text in typographic fonts, electronic forms, graphics, image, lines, boxes, and bar codes. The AFP MO:DCA data stream includes architected, structured fields that describe each of these elements.

In a further embodiment, the printing software product communicates with printer 109 via an Intelligent Printer Data Stream (IPDS). The IPDS data stream is similar to the AFP data steam, but is built specific to the destination printer 109 in order to integrate with each printer's specific capabilities and command set, and to facilitate the interactive dialog between the print server 108 and printer 109. The IPDS data stream may be built dynamically at presentation time, e.g., on-the-fly in real time. Thus, the IPDS data stream is provided according to a device-dependent bi-directional command/data stream.

PDF print files may also be processed in printing network 106. In such an embodiment, the PDF files are pre-processed at print server 108 before undergoing print processing at the printing software product to transform a PDF into an AFP MO:DCA data stream. According to one embodiment, print server 108 provides a transform that includes an indexable text version of the AFP MO:DCA data stream, in addition to an AFP image data stream.

Figure 2:
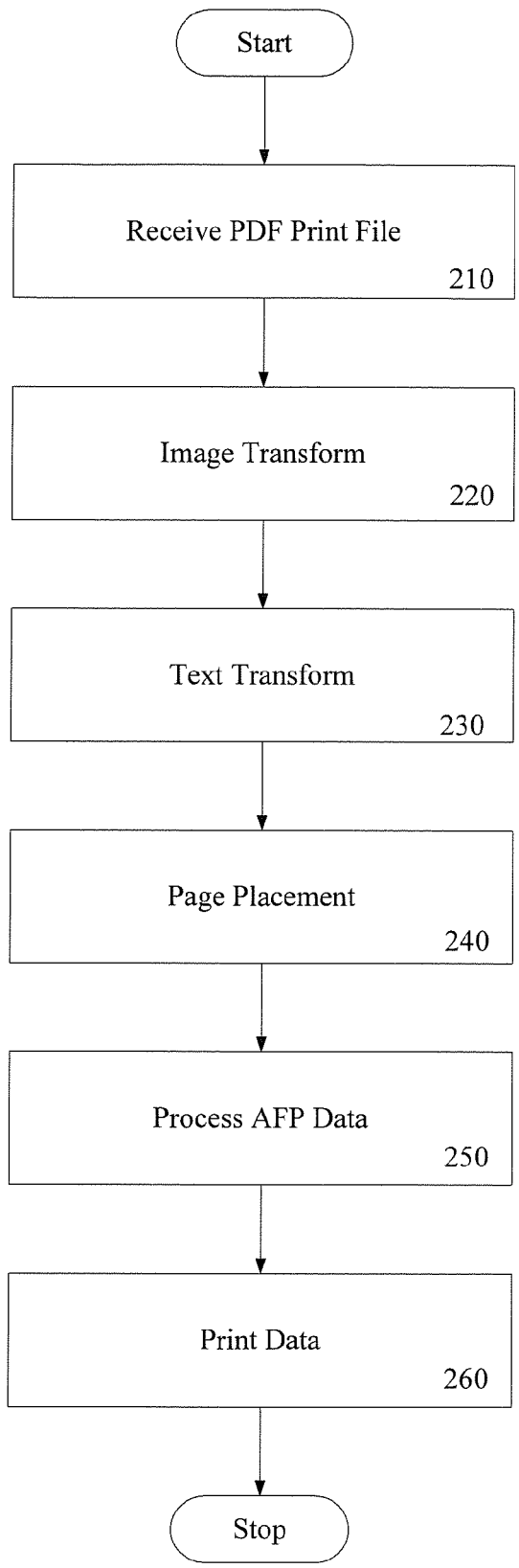
FIG. 2 is a flow diagram illustrating one embodiment of transforming PDF print data to AFP data.

FIG. 2 is a flow diagram illustrating one embodiment of transforming PDF print data to AFP data. At processing block 210, a PDF print file is received at print server 108. At processing block 220, an image transform is applied to the print data in the PDF file to generate an AFP image data stream. At processing block 230, a second transform is performed on the PDF data to generate an AFP text data stream. In one embodiment, the text transform extracts the text, text location data, and text size data from the PDF file.

At processing block 240, the extracted text data is placed in an AFP formatted data stream on document page locations according to the extracted text location and size data. According to one embodiment, the text location and size data are used to perform a "use color of medium" AFP Presentation Text Object Content Architecture (PTOCA) command to place extracted text behind a corresponding image version of the text data.

In such an embodiment, a fixed pitch outline font is scaled in both the X and Y direction to fill the area occupied by the text. The text is subsequently, mapped to a page using the "color of medium" command at the proper XY location of the text in the image. FIGS. 3A and 3B illustrate one embodiment of AFP text data and AFP image data, respectively, after the transforms have been performed, while FIG. 3C illustrates the text data being placed behind the image data.

Figure 4:
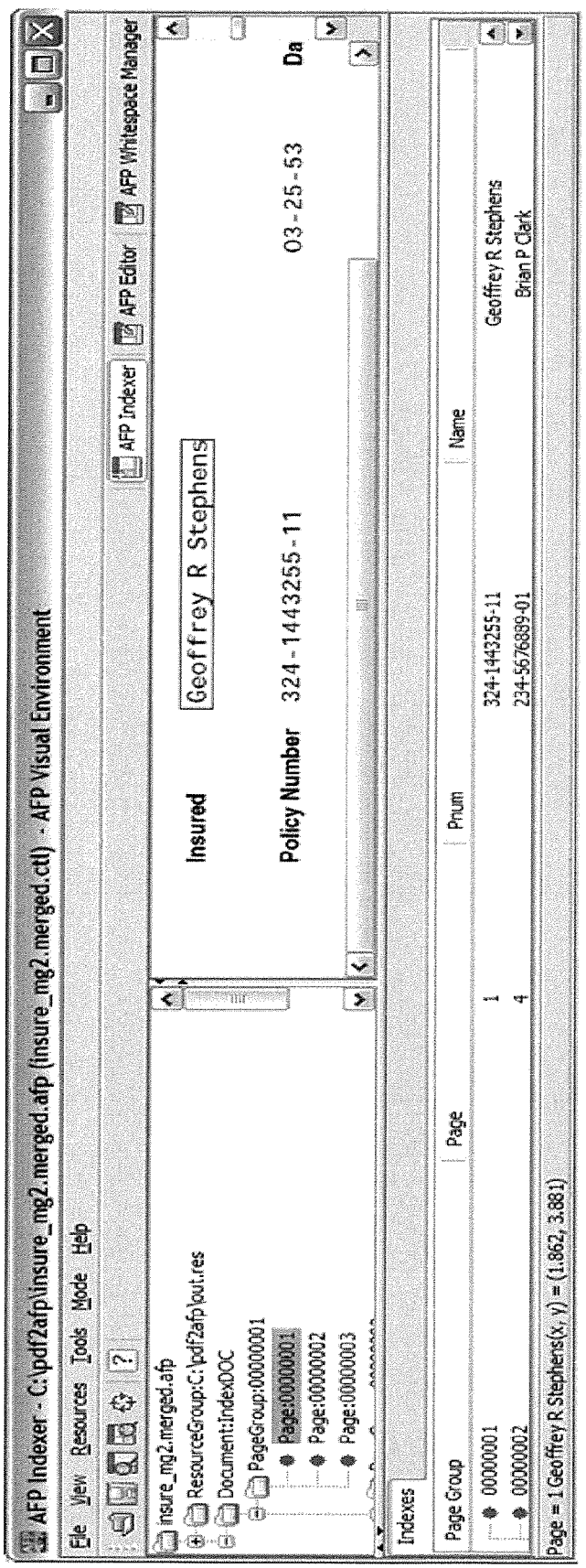
FIG. 4 illustrates one embodiment of a screen shot of an indexer tool.

At processing block 250, both AFP data streams are received at the printing software product where the data is processed to be printed. As discussed above, the data may be converted to an IPDS data stream. At processing block 260, the data is printed. Since the text data has the same color as the medium, the print text data will be invisible. Thus, only the data high fidelity image data will appear on the medium. In one embodiment, the print data streams may be accessed by the printing software product via GUI 120. In such an embodiment, AFP text data can be used by an indexer tool within GUI 120 to index the underlying hidden AFP text for indexing. FIG. 4 illustrates a screen shot of one embodiment of an indexer tool.

Figure 5:
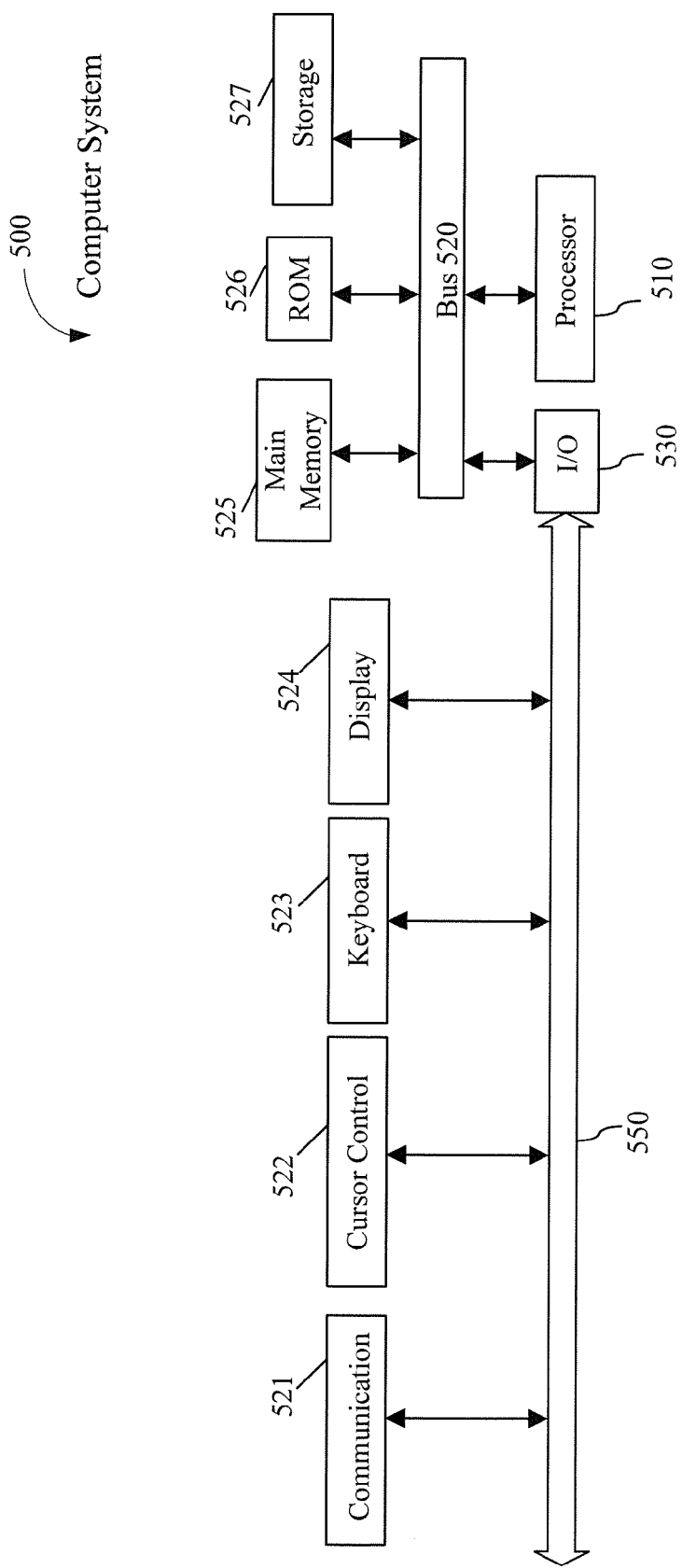
FIG. 5 illustrates one embodiment of a computer system.

FIG. 5 illustrates a computer system 500 on which data processing system 102 and/or server 108 may be implemented. Computer system 500 includes a system bus 520 for communicating information, and a processor 510 coupled to bus 520 for processing information.

Computer system 500 further comprises a random access memory (RAM) or other dynamic storage device 525 (referred to herein as main memory), coupled to bus 520 for storing information and instructions to be executed by processor 510. Main memory 325 also may be used for storing temporary variables or other intermediate information during execution of instructions by processor 510. Computer system 500 also may include a read only memory (ROM) and or other static storage device 526 coupled to bus 520 for storing static information and instructions used by processor 510.

A data storage device 527 such as a magnetic disk or optical disc and its corresponding drive may also be coupled to computer system 500 for storing information and instructions. Computer system 500 can also be coupled to a second I/O bus 550 via an I/O interface 530. A plurality of I/O devices may be coupled to I/O bus 550, including a display device 524, an input device (e.g., an alphanumeric input device 523 and or a cursor control device 522). The communication device 521 is for accessing other computers (servers or clients). The communication device 521 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A computer generated method comprising:
receiving a Portable Document Format (PDF) print job file;
applying a first transform to generate an Advanced Function Presentation (AFP) image print job data stream; and
applying a second transform to generate an AFP text print job data stream by extracting text, location and size data from the PDF print job file to perform a use color of medium AFP Presentation Text Object Content Architecture (PTOCA) command.

2. The method of claim 1 further comprising placing text data at document page locations indicated by the location and size data.

3. The method of claim 1 wherein the AFP PTOCA command places the extracted text behind a corresponding image version of the text data.

4. The method of claim 1 further comprising printing the AFP image print job data stream and the AFP text print job data stream on a print medium.

5. The method of claim 4 wherein the AFP text print job data stream is printed as the color of the print medium to appear invisible.

6. The method of claim 4 further comprising accessing the AFP text print job data stream to index data within the AFP text print job data stream.

7. A print server comprising:
a first transform to convert a Portable Document Format (PDF) print job file to an Advanced Function Presentation (AFP) image print job data stream; and
a second transform to convert the PDF print job file to an AFP text print job data stream by extracting text, location and size data from the PDF print job file to perform a use color of medium AFP Presentation Text Object Content Architecture (PTOCA) command.

8. The print server of claim 7 wherein the second transform places text data at document page locations indicated by the location and size data.

9. The print server of claim 7 wherein the AFP PTOCA command places the extracted text behind a corresponding image version of the text data.

10. The print server of claim 7 further comprising a printing software product to process the AFP image print job data stream and the AFP text print job data stream for printing.

11. The print server of claim 7 wherein the printing software product includes a graphical user interface (GUI) to access the AFP text print job data stream to index data within the AFP text print job data stream.

12. An article of manufacture comprising a non-transitory machine-readable medium including data that, when accessed by a machine, cause the machine to perform operations comprising:
receiving a Portable Document Format (PDF) print job file;
applying a first transform to generate an Advanced Function Presentation (AFP) image print job data stream; and
applying a second transform to generate an AFP text print job data stream by extracting text, location and size data from the PDF print job file to perform a use color of medium AFP Presentation Text Object Content Architecture (PTOCA) command.

13. The article of manufacture of claim 12 comprising a machine-readable medium including data that, when accessed by a machine, further cause the machine to perform operations comprising placing text data at document page locations indicated by the location and size data.

14. The article of manufacture of claim 12 wherein the AFP PTOCA command places the extracted text behind a corresponding image version of the text data.

* * * * *